Oct. 4, 1938.     H. NOCK     2,131,784
TRACK FOR OVERHEAD DOOR HANGERS
Filed Nov. 14, 1936

INVENTOR.
HARRY NOCK
BY
ATTORNEY.

Patented Oct. 4, 1938

2,131,784

UNITED STATES PATENT OFFICE 2,131,784

TRACK FOR OVERHEAD DOOR HANGERS

Harry Nock, Toronto, Ontario, Canada, assignor to Elevator Supplies Company, Incorporated, Hoboken, N. J., a corporation of New Jersey Application November 14, 1936, Serial No. 110,838

4 Claims. (Cl. 16—96)

This invention relates to tracks for overhead door hangers, and a combination track and door hanger, and provides improvements therein.

The invention provides an improved track for overhead door hangers, on which the hangers and doors run noiselessly, or nearly so, and which is of a strong and secure construction, adapting it for use with heavy doors, and especially for the heavy doors now largely used in shaftways of elevator structures, at various floor landings. It is however, well adapted for other types of doors where strength, safety and noiseless operation are desired.

The invention further provides a track, the tread portion of which may be replaced when worn, without the necessity of removing the track, or the hanger and door mounted thereon.

Two embodiments of the invention are illustrated in the accompanying drawing, wherein.

Figure 1:
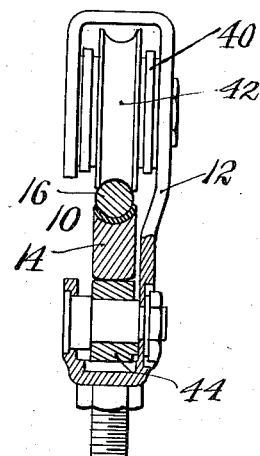
Fig. 1 is a cross-section of the track, and of a door hanger mounted thereon.

Referring to said drawing, numeral 10 designates the track and numeral 12 the overhead door hanger.

The track 10 comprises a beam portion 14 and a tread portion 16. To make the beam portion strong and capable of supporting heavy doors, the beam portion 14 is elongated in the direction of the weight transmitted thereto through the hanger 12, and is advantageously a relatively wide bar of steel. The steel may be of an ordinary quality which is tough and strong and relatively inexpensive, (low carbon steel); it does not have to be hardened to resist wear, as do the tracks heretofore in use, on which the hangers run in direct contact therewith. The upper side of the beam portion 14 is provided with a half-round or arc-shaped groove 18 running longitudinally thereof. For supporting the track in spaced relation to the wall surface or lintel to which it is attached, a suitable number of brackets 20 is provided. These brackets 20 comprise blocks or projections 22 of less width than the beam 14, so as to allow the upper and lower sides of the track to be free or unobstructed.

The tread portion 16 of the track is a round rod which fits into and extends along the groove 18 in the beam 14. Shock-absorbing material 25 is interposed between the tread portion 16 and the beam 14, which material also has the effect of making the movement of the hanger on the track noiseless or almost so.

Figure 2:
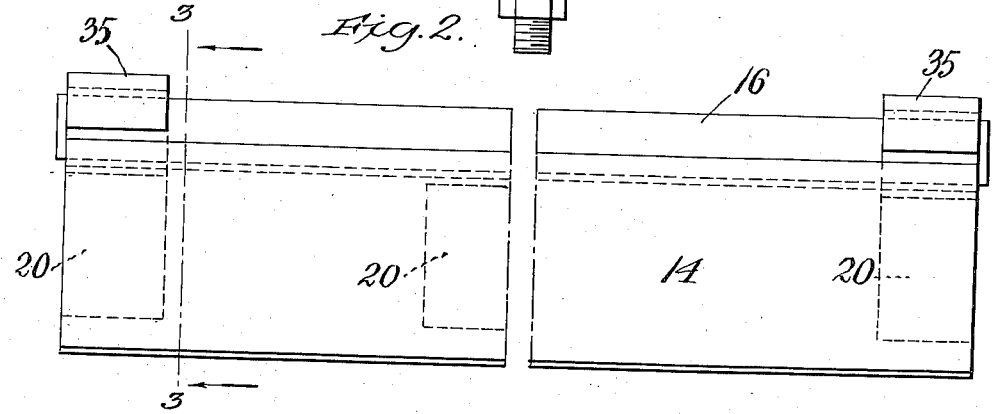
Fig. 2 is a view in side elevation of the track.
Figure 3:
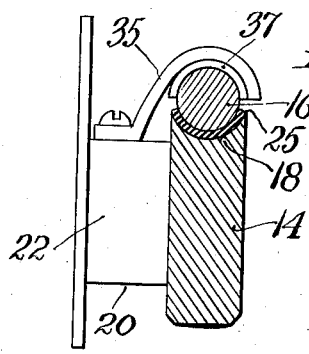
Fig. 3 is a cross-section on the line 3—3, Fig. 2.

In the embodiment illustrated in Figs. 1 to 3 inclusive, the tread portion 16 is a round piece of steel, which may be hard so as to resist wear, and the shock-absorbing material 25 may be a strip of rubber running lengthwise of the groove 18 between the beam 14 and the rod 16.

Figure 4:
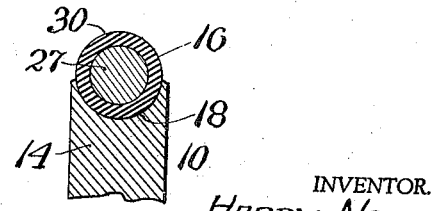
Fig. 4 is a view of the track in cross-section illustrating a second embodiment.

In the form of embodiment illustrated in Fig. 4, the tread portion may be a round rod formed wholly or in part of a shock-absorbing material, such for example as canvas Bakelite. As shown in Fig. 4, the tread portion comprises a steel rod or core 27 surrounded by a layer of shock-absorbing material such as the canvas bakelite heretofore referred to. Various other materials having shock-absorbing properties and fairly good wear resistance could be used in the place of Bakelite.

Clamps 35 may be provided at the ends of the track for clamping and holding the tread portion 16 in the groove 18 in the beam portion 14. Shock-absorbing material 37, rubber for example, may be inserted between the clamps 35 of the tread portion 16. In Fig. 4, clamp 35 would bear directly on the shock-absorbing portion 30 of the tread 16.

The hanger 12 comprises a wheel or roller 40 having a half-round or arc-shaped groove 42 therein conforming to the circular shape of the tread portion 16, and the hanger 12 also advantageously further comprises a roller 44 which runs upon or closely adjacent to the lower side of the beam 14. The rollers 40 and 42 of the hanger by reason of their proximity to the upper and lower sides of the track 10, and by reason of the half-round or arc-shaped groove 42 in the roller 40, act to prevent the tread portion 16 from rising out of the groove 18, and thereby prevent the hanger and door being forced off the track, and falling, with consequent liability of causing serious injury and damage, particularly in the case of heavy doors used in the shaftways of elevators. The construction of the hanger and track heretofore described has the further advantage of facilitating the removal of the doors and hangers from the tracks, when desired. By freeing the bottom of the door (which usually runs in a groove or on a guide) the door may be swung laterally, the groove roller 40 sliding around the tread portion 16, until the roller 44 is clear of the underside of the beam 14. When in this position the door and hanger may be lifted from the track 10; it may be replaced in like manner. The aforesaid construction also enables the hanger to run on the track without binding, when the hanger is attached to the door in such manner as to be slightly out of vertical alinement with the track.

When the tread portion 16 of the track becomes worn, the worn portion may be readily replaced without the necessity of removing the door or hanger, by loosening the clamps 35, and turning around the tread member in the groove 18 until the unworn portion is brought into position under the roller 40. After the turning of the tread portion 16, as just described, the clamps 35 may be again tightened, and the roller 40 then is on an unworn portion of the tread on which to run.

The invention may receive other embodiments than those herein specifically illustrated and described.

What is claimed is:

1. A track for overhead door hangers, comprising a beam portion and a tread portion; said beam being of metal, elongated in the direction of the weight transmitted thereto through a hanger and having a longitudinal groove along its top, said tread being a round rod, fitting into and extending above said groove, and shock-absorbing material between said beam and said rod.

2. A track for overhead door hangers, comprising a beam portion and a tread portion; said beam being of metal, elongated in the direction of the weight transmitted thereto through a hanger, and having a longitudinal groove along its top, said tread being a round rod, fitting into and extending above said groove, and shock-absorbing material between said beam and said rod, and means for fastening said rod, in any of a number of radial positions, in said groove, said rod being rotatable in said groove to present new surfaces for portions of the surface which have been worn by the action thereon of the hanger.

3. A track for overhead door-hangers, comprising a beam portion and a tread portion, said beam being of metal, elongated in the direction of the weight transmitted thereto through a hanger, and having a longitudinal groove along its top, said tread being a round rod fitting into and extending above said groove, and having an exterior portion of shock-absorbing material.

4. A track for overhead door-hangers, comprising a beam portion and a tread portion, said beam being of metal, elongated in the direction of the weight transmitted thereto through a hanger, and having a longitudinal groove along its top, said tread being a round rod fitting into and extending above said groove, and having an exterior portion of shock-absorbing material and a core of metal.

HARRY NOCK.